_United States Patent Office_ 3,069,833
Patented Dec. 25, 1962

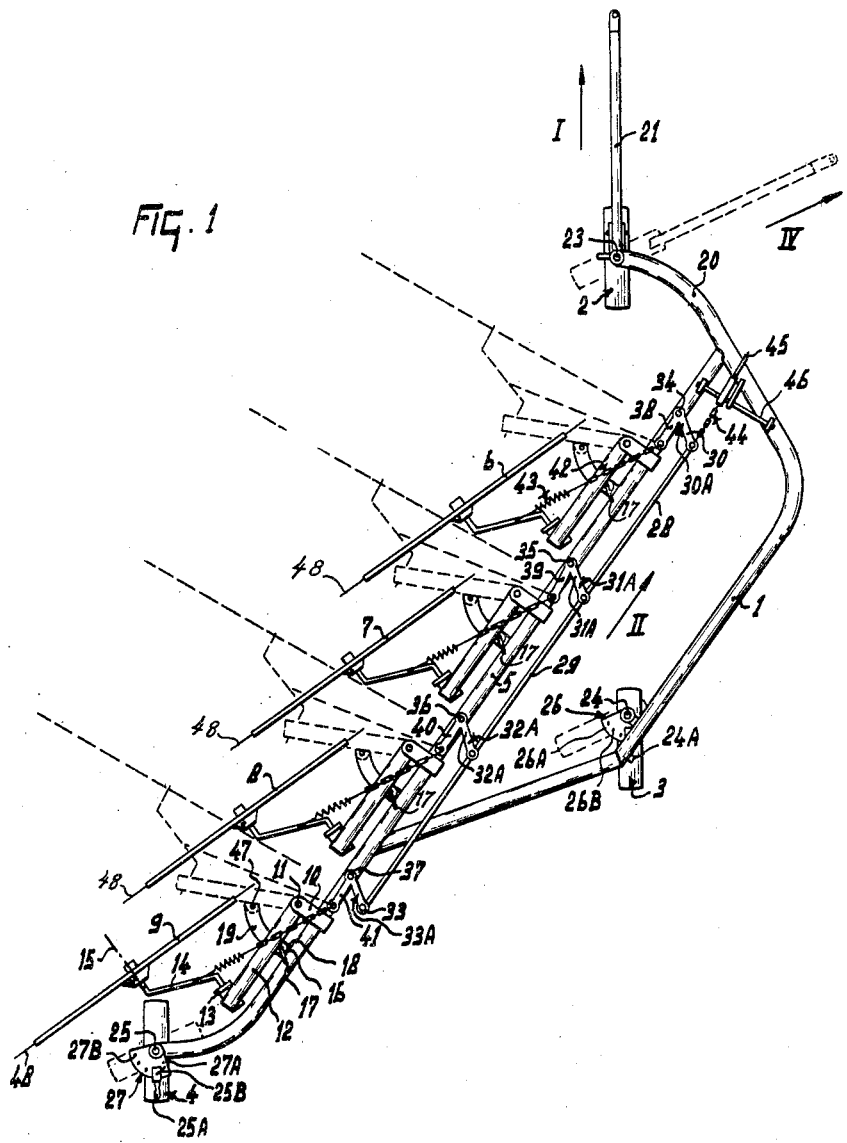

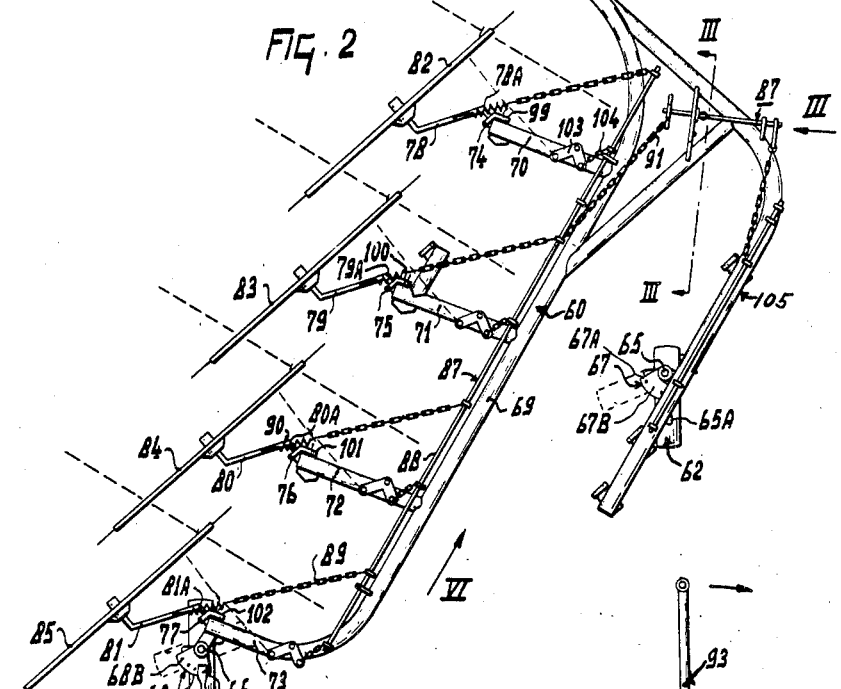

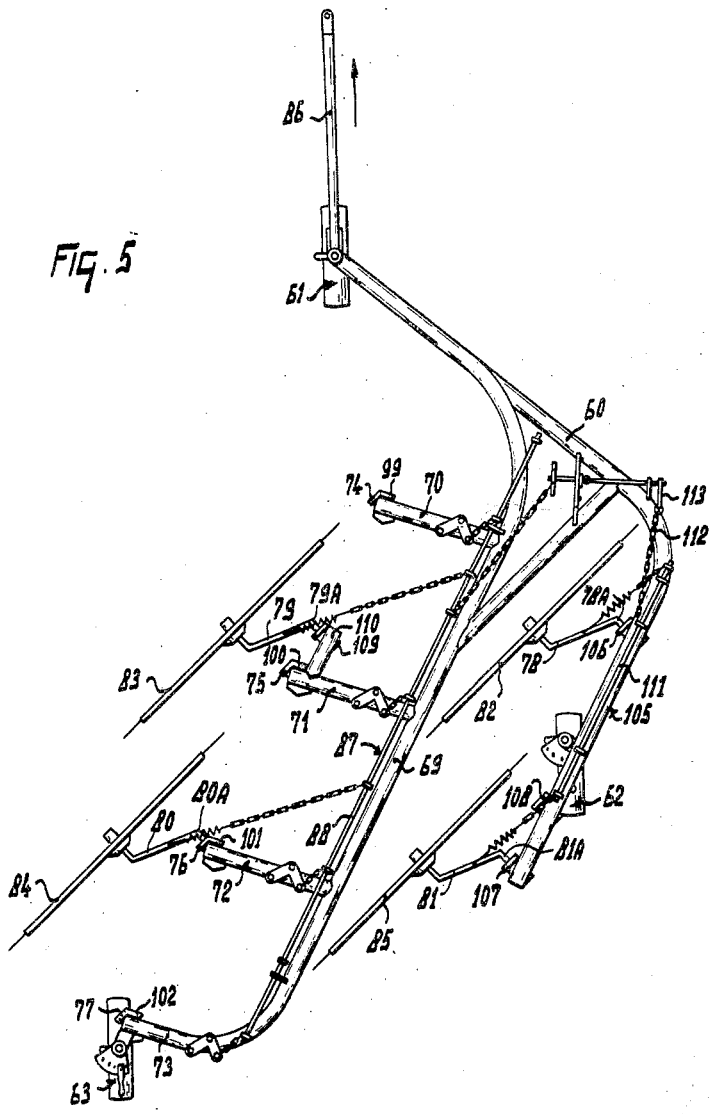

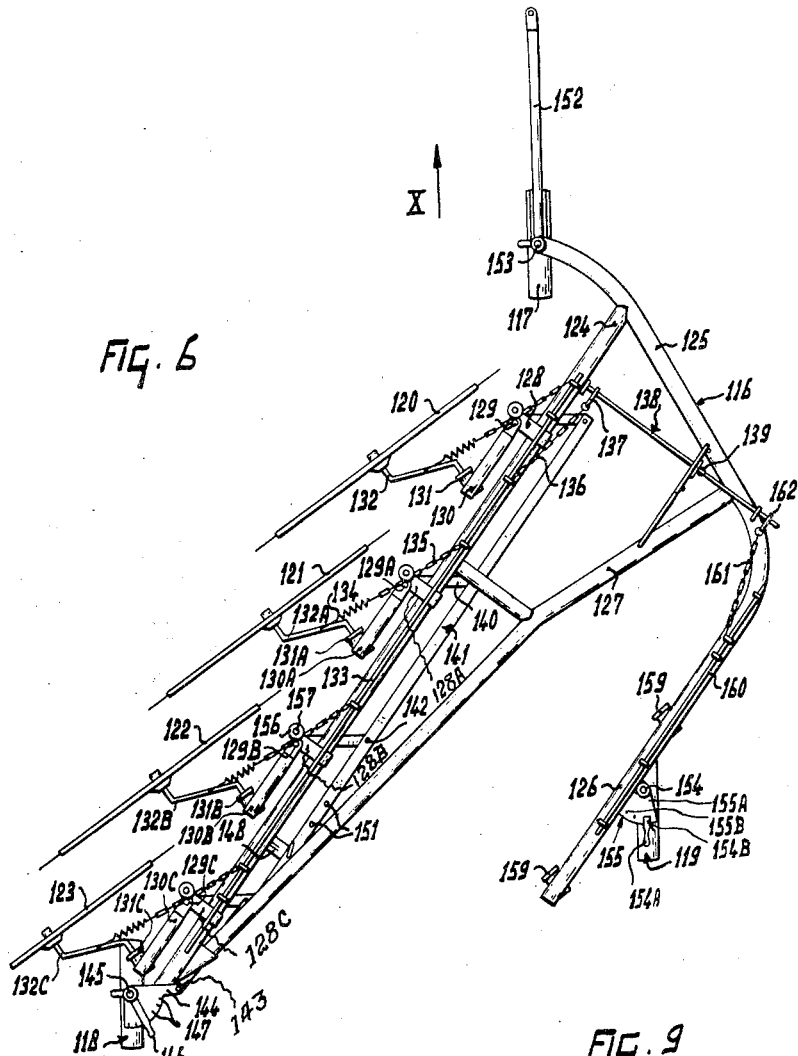

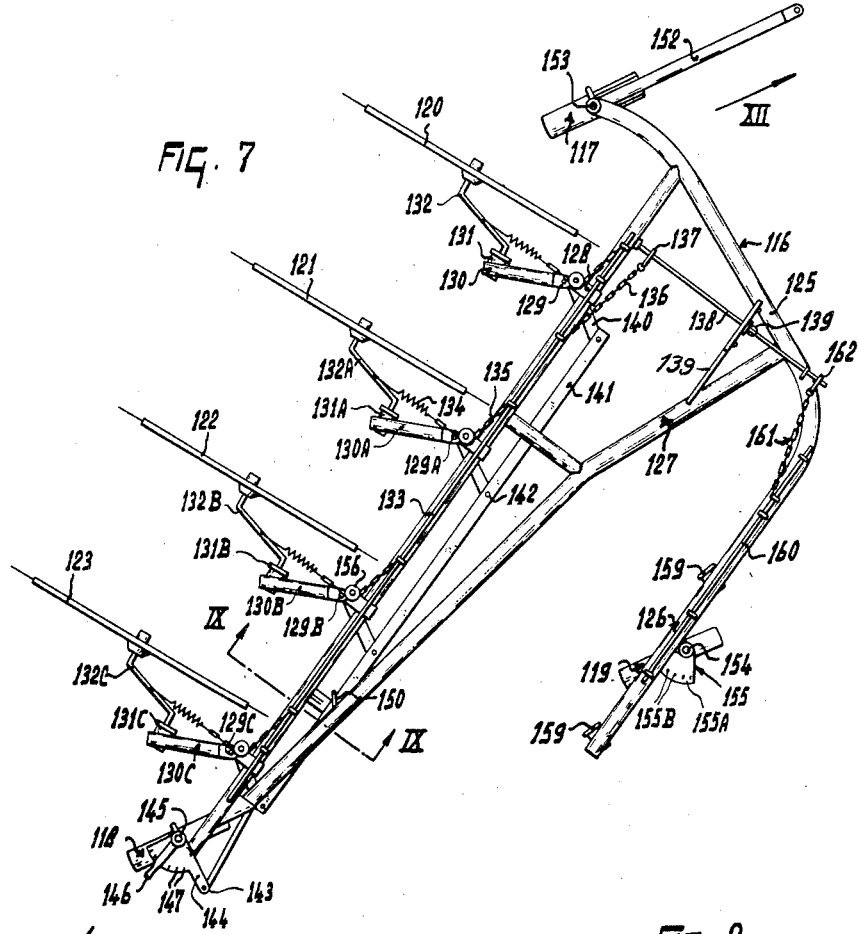

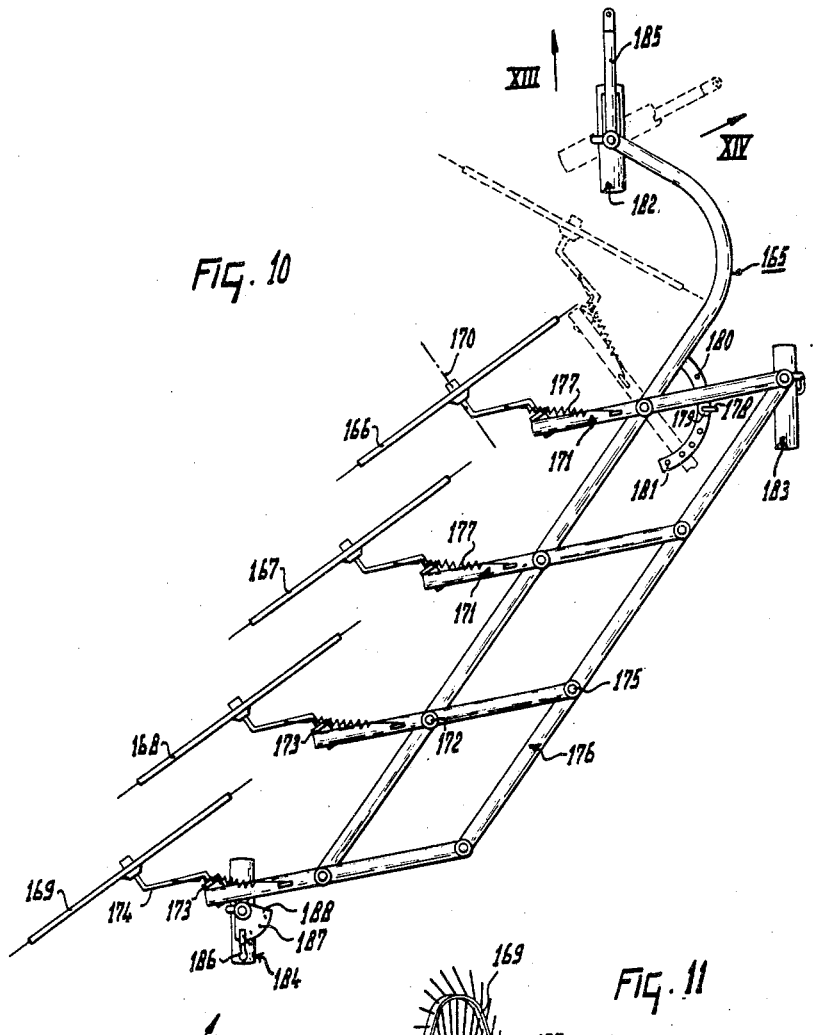
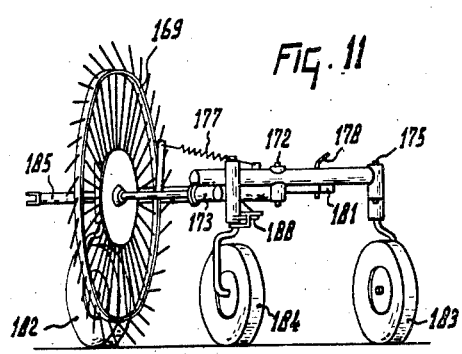

3,069,833
DEVICES FOR THE LATERAL DISPLACEMENT
OF CROP LYING ON THE GROUND
Cornelis van der Lely, Maasland, Netherlands, assignor to C. van der Lely N.V., Maasland, Netherlands, a Dutch limited-liability company of the Netherlands
Filed Mar. 9, 1959, Ser. No. 798,028
Claims priority, application Netherlands Mar. 15, 1958
24 Claims. (Cl. 56—366)

This invention relates to an implement for the lateral displacement of crop lying on the ground comprising a frame supported on ground wheels at least one of which has an adjustable and lockable swivel axis, and a row of rake wheels, the arrangement being such that the implement can be employed in two different working positions, in the first of which the implement lies obliquely to and mainly to the left of the line of draught of the implement as viewed in the direction of travel, whilst in the second working position it lies obliquely to and mainly to the right of the line of draught.

With the known implements of the kind set forth, to bring the implement from the first to the second working position, it is usually necessary to disconnect the implement from the tractor or the like. Such disconnection can often take much time and can give rise to accidents particularly when working on a slope. It is an object of the invention to devise an implement of the kind set forth which will not have to be disconnected from the tractor or the like when it is to be brought from one working position to another.

In accordance with the invention this can be achieved by the fact that the arrangement is such that the draught point for the implement in both the first and second working positions is located at the same place in the implement, said point being upon a vertical axle which lies in, or near to, a vertical plane containing the centres of the rake wheels.

Furthermore the invention relates to an implement for the lateral displacement of crop lying on the ground comprising a frame which carries a plurality of rake wheels, the connection of the rake wheels to the frame being such that they can be turned about substantially vertical axes whereby the rake wheels can be brought to a setting relative to the frame appropriate for side-delivery raking, and can be brought to another setting relative to the frame appropriate for tedding, whereby the implement may be employed in a first working position as a side-delivery rake and in a second working position as a tedder, whilst the rake wheels are mounted on auxiliary supporting arms, one end of each of which is connected to the frame through the intermediary of a pivot which is vertical or nearly so, the auxiliary supporting arms being situated at or about the level of the axes of rotation of the rake wheels. Owing to this a simple device is obtained which can be changed from one working position into the other in a simple manner, whereas the centre of gravity of the device may be low and the frame will not hinder the view on the working of the device.

An advantageous embodiment is obtained when the rake wheels are coupled to a lifting device in order that they may be displaced in vertical direction, the crank of each rake wheel being connected with a part of the lifting device which is located near the pivot of the associated auxiliary supporting arm on the frame, the arrangement being such that the rake wheels can be coupled with the same lifting device in both working positions.

A favourable embodiment is obtained when the connection between the crank and the part of the lifting device near the pivot of the associated auxiliary supporting arm is flexible, consists for example of a chain or wire, said connection being bent around a part of the circumference of a pulley which is turnable about a vertical axis, whilst said part of the circumference is located above the pivot of the auxiliary supporting arm.

This invention also alternatively relates to an implement for the lateral displacement of crop lying on the ground, comprising a frame including a frame beam, and a row of rake wheels supported so that the row extends along said beam, the arrangement being such that the rake wheels can be brought to two different settings relative to said beam whereby the implement can occupy two different working positions, whilst auxiliary supporting arms are mounted on the frame beam, so as to extend perpendicularly (or nearly so) therefrom, the free end of each arm carrying two bearers for the mounting of an associated rake wheel in either of two positions corresponding to the two working positions of the implement. Owing to this a cheap implement can be obtained which can be brought from one working position to the other in a simple manner.

For a better understanding of the invention and to show how the same may be carried into effect reference will now be made, by way of example, to the accompanying drawings in which:

FIGURE 1 is a plan view of a first embodiment of an implement according to the invention, FIGURE 2 is a plan view of a second embodiment of an implement according to the invention, FIGURE 3 is a plan view taken on the line III—III of FIGURE 2 and looking in the direction of the arrows, FIGURE 4 is a plan view with parts broken away and shown in section of the implement shown in FIGURE 2, and FIGURE 5 is a plan view of the implement shown in FIGURE 2 in a different working position, FIGURE 6 is a plan view of a third embodiment of the implement in a first working position, whilst FIGURE 7 is a plan view of the implement shown in FIGURE 6 in a second working position, FIGURE 8 is an elevation as seen in the direction of the arrow VIII in FIGURE 7, FIGURE 9 is a sectional view of an enlarged detail of the implement taken on the line IX—IX of FIGURE 7, FIGURE 10 is a plan view of a fourth embodiment, and FIGURE 11 is an elevation as seen in the direction of the arrow XI in FIGURE 10.

As appears from FIGURE 1, the implement has a frame 1 supported on three ground wheels 2, 3 and 4. The frame 1 includes a frame beam 5 to which four rake wheels 6, 7, 8 and 9 are fastened. The rake wheels 6, 7, 8 and 9 are all attached in a similar manner to the frame beam 5, and it will therefore suffice to describe the manner of attachment of only the one rake wheel. In the following the attachment of the rake wheel 9 is described.

A bracket 10 is fixed on the frame beam 5, such bracket having an auxiliary supporting arm 12 connected thereto by a vertical pivot pin 11. The free end of the auxiliary supporting arm 12 carries a bearing 13 in which the crank axle of a crank 14 is journalled, the auxiliary supporting arm being immovably fixed to the frame beam 5 in vertical direction during working of the implement. The crank pin of the crank 14 has the rake wheel 9 mounted thereon so as to be freely rotatable about an axis indicated at 15, such axis being level with the frame 1. The auxiliary supporting arm 12, fixed to the frame with only one end, can be locked against movement about its pivotal connection 11 with the aid of a locking pin 17 entered in a hole formed in a lug 16 attached to the supporting arm. Beneath the lug 16 there lies an arcuate strip 19 fixed upon the beam 5. The pin 17, after being entered in the hole in the lug 16, can be entered in a hole 18 in the strip 19 whereby the supporting arm 12 is locked in position.

In the full-line position of the auxiliary supporting arms 12 shown in FIGURE 1, they lie along the frame beam 5 and the rake wheels 6 to 9 carried thereby are all in settings appropriate for side-delivery raking in which all the rake wheels will co-operate to deliver crop to one side of the implement. It will be noted that in this setting of the rake wheels, the centres of the latter are spaced from the frame beam 5 by a distance which is less than half the diameter of a rake wheel. With this setting of the rake wheels, the implement is moved in the direction indicated by the arrow I. With respect to this travelling direction the frame lies substantially behind the row of rake wheels. The implement is towed with a draw-bar 21 which is pivotally secured at the front end 20 of the frame near the front end of the row of rake wheels. The pivot 23 of such pivotal connection lies near to the vertical plane passing through the centres of the rake wheels 6 to 9. It will be realized that the line of draught passes through the axis of the pivot 23 and that when the implement travels in the direction I the implement lies mainly to the left of the line of draught and generally obliquely thereto.

The vertical pivot 23 serves also as the swivel axle for the ground wheel 2, the arrangement being such that when the draw-bar 21 is swung about the axis of the pivot 23 the wheel plane of the ground wheel 2 moves correspondingly so that the ground wheel 2 is a direction control wheel. In order to resist lateral forces exerted on the implement during its use and thereby maintain the direction of travel of the implement in the desired direction I, the ground wheels 3 and 4 are connected to the frame with the aid of vertical swivel axles 24 and 25, which can be fixed relatively to the frame 1 by means of locking devices 26 and 27. Wheel 3 is adjustably secured in various positions by locking member 24A in association with sector plate apertures 26B and wheel 4 is adjustably secured in various positions by the insertion of a portion of element 25B of locking member 25A in apertures 27B in sector plate 27A. This construction is shown in FIGURE 3 of my Patent No. 2,922,270, issued January 26, 1960, or by reference numerals 9 to 13 of FIGURE 1 of this patent, also by reference numerals 26, 27, 28, 29 and 31 of FIGURE 1, of my Patent No. 2,922,269, issued January 26, 1960. These constructions have been used in numerous applications for patent.

In order that the implement may be brought to a position where it may be transported, a lifting device 28 is provided for raising the rake wheels 6 to 9 from the ground. The lifting device comprises a rod 29 extending along the frame beam 5 and pivotally connected with arms 30 to 33 of bellcrank levers 30A, 31A, 32A and 33A, respectively which are pivotally mounted upon the frame beam 5 as at 34 to 37. The other arms 38, 39, 40 and 41 of the bellcrank levers are coupled with the cranks supporting the rake wheels 6 to 9 with the aid of chain and spring assemblies 42, 43. The rod 29 is connected with a lever 45 by means of a chain 44, the lever being fixed on a rotatable shaft 46 which is mounted at about the same level as the frame beams comprising the frame 1. The chain 44 is anchored to the lever 45 at a location above the shaft 46, so that when the lever 45 is swung, the shaft 46 is correspondingly turned and the rod 29 can be moved in a direction parallel to the longitudinally extending beam 5. The lever 45 may be secured to the framework in any suitable manner, such as shown by the mounting of rod 93 in FIGURE 3, and reference may be made to this figure for the operation and mounting of lever 45. By moving the rod 29 in the direction shown by the arrow II, the arms 30 to 33 of the bellcrank levers will be turned about their pivotal connections 34 to 37 in an anti-clockwise direction as seen from above. Each of the arms 38 to 41 of the bellcrank levers, lies near to the associated pivot 11 of the associated supporting arm 12, and the anti-clockwise turning movement of the bellcrank levers will cause the rake wheels 6 to 9 to be lifted away from the ground. The springs 43 included in each connection between a crank and its associated bellcrank lever, will permit the cranks of the rake wheels to move in their bearings to enable the rake wheels to accommodate unevennesses in the ground. When the implement is in use, the tension in the springs 43 can be maintained at a value such that the rake wheels do not bear on the ground under the action of their full weight.

From the first working position where the implement operates as a side-delivery rake, the implement can be brought to a second working position where it will act as a tedder. This second working position can be attained by moving the rake wheels 6 to 9 about their vertical pivots 11 so that the rake wheels will be brought to a setting indicated in chain lines in FIGURE 1. This adjustment of the rake wheels is effected by first removing the locking pins 17 from the holes 18 in the arcuate strips 19. Each rake wheel can then be moved about the associated pivot 11. After the rake wheels have been brought to the new setting, they may be locked in position by entering the locking pin in another hole 47 formed in each arcuate strip 19. In the second working position the auxiliary supporting arms 12 are inclined to the frame beam 5 at an angle of 60°. The auxiliary supporting arm 12, in the first and in the second working position, is located in the same quadrant defined by the frame beam 5 and a plane perpendicular thereto and including the pivot of the supporting arm concerned.

The tines 48 of the rake wheels 6 to 9 do not extend radially but are bent backwardly in relation to the direction of rotation of the rake wheel, so that on the rising side of a rake wheel the tines are directed downwardly and can therefore readily shed any crop engaged thereon and tending to travel upwardly over the wheel. In the first working position where the rake wheels are in their full-line setting with the direction of travel I, the rake wheels rotate by virtue of their contact with the ground in such a way that the tines 48 are in fact downwardly directed on the rising side of each wheel. When the rake wheels are brought to the setting shown in broken lines for the second working position of the implement, it will be observed that when the implement is moved in the direction of the arrow IV the rotation of the rake wheels brought about as the result of their cooperation with the ground will be such that the tines 48 are still downwardly directed on the rising side of each rake wheel. When the implement is in its second working position and is travelling in the direction IV, the rake wheels 6 to 9 will operate independently and will each work a separate strip of ground. The implement will then act as a tedder. In the second working position the axes of rotation of the rake wheels are in alignment. The change in the direction of travel from the direction I to the direction IV can easily be effected by release of the locking devices 26 and 27 of the ground wheels 3 and 4, and thereafter setting the ground wheel 4 in its position appropriate to the direction IV and relocking this ground wheel in its setting with the aid of the locking device 27. Forward movement of the implement with the ground wheel in the setting shown in chain dotted lines in FIGURE 1 will result in the swinging of the frame of the implement about its pivotal connection with the drawbar 21 until the drawbar and frame are in the relative position shown by the broken line position of the draw-bar, the direction of travel of the implement then being as indicated by the arrow IV. For the alteration of the working position the implement need not be disconnected. The unlocked ground wheel 3 will automatically take up the position shown in broken lines since the vertical swivel axis of this ground wheel is displaced from the rotary axis of the wheel, i.e. the ground wheel 3 is mounted caster fashion. In the second working position, the ground wheel 3 may be left unlocked so that it operates simply as a caster wheel or it can be locked in the appropriate position. It will be observed that in the second working position the implement lies oblique to the line of draught and to the right thereof. The ground wheel 4, like the ground wheel 2, is situated near to the vertical plane which includes the centres of the rake wheels. In both working positions the ground wheel 4 is essentially a direction control wheel.

In both the first and the second working position the cranks 14 are connected with the arms 38 to 41 of the bellcranks with the aid of the chains 42. In the first working position the chain 42 is located at the one side of the pivot 11 and in the second working position at the other side of the pivot 11.

It will be noted that in the first working position of the implement, the ground wheels 2, 3 and 4 do not lie in front of the rake wheels 6 to 9 having regard to the direction of travel I, so that crop to be worked by the rake wheels will not be ridden over by the ground wheels before engaging the rake wheels. In this first working position, the crop will be finally displaced by the rake wheel 9 in a direction towards the left, and will be appreciated that any large windrow that is being made, will not be ridden over by any of the ground wheels. In the second working position, in the direction of travel of the implement, the ground wheel 2 lies in front of the rake wheel 6. In this second working position however, each rake wheel works independently with the object of lifting the crop lying on the ground and re-depositing it in an airy condition so that the crop will be more easily dried. It is important in this case that the ground wheels should not ride over the crop after it has been worked. In this second working position, where the centres of the rake wheels are more remote from the frame beam 5 than in the first working position, the ground wheel 2 does not ride over the crop after it has been worked by the rake wheels. Although in this second working position the rake wheels are more remote from the frame than in the first working position, the implement will nevertheless have a satisfactory degree of stability for the reason that the frame beam 9 lies on the same side of the line joining the ground wheels 2 and 4 as does the ground wheel 3.

Referring now to FIGURES 2 to 5 which show the second embodiment, it will be seen that there is a frame 60 supported on ground wheels 61, 62 and 63 which are connected with the frame through the intermediary of their vertical swivel axles 64, 65 and 66. The ground wheels 62 and 63 can have their swivel axles fixed relatively to the frame with the aid of locking devices 67 and 68. My issued patents referred to above show in more detail the construction of locking devices which have been used on inventions of this type for some time. The frame 60 includes a frame beam 69 to which auxiliary supporting arms 70, 71, 72 and 73 are immovably fixed, the support 73 being conveniently formed by bending the rear end of the frame beam 69. The auxiliary supporting arms 70 to 73 are inclined to the frame beam 69 at an angle of substantially 90°. Bearings 74 to 77 are carried at the free ends of the arms 70 to 73, the centre lines of these bearings being parallel to one another. The crank axles 78A to 81A of cranks 78 to 81, respectively, are journalled in the bearings 74 to 77, the crank pins of the cranks having freely rotatable rake wheels 82, 83, 84 and 85 disposed thereon. In FIGURE 2, in full lines, the rake wheels 82 to 85 are shown in their settings appropriate for side-delivery raking in which the rake wheels all co-operate to deliver crop to one end of the row thereof. The ground wheels 61, 62 and 63 are again arranged in such manner that when the implement is in its working position as a side-delivery rake and is moved in the direction indicated by the arrow V, these rake wheels do not ride over the crop before it is worked by the rake wheels.

The implement is arranged to be drawn with the aid of a draw-bar 86 which is connected with the vertical swivel axle 64 of the ground wheel 61 so that the draw-bar 86 may be moved with reference to the frame about the pivotal axis afforded by such axle 64, the ground wheel 61 being then correspondingly moved. It will be noted that with the line of draught for travel in the direction V, the row of rake wheels lies obliquely to the line of draught and to the left and in rear thereof. It will also be noted that the ground wheel 61 is situated near to the vertical planes passing through the centres of the rake wheels 82 to 85 constituting the row.

In order to bring the implement to a position appropriate for transport in which the rake wheels are raised from the ground, the frame is provided with a lifting device 87 which includes a rod 88 located over and along the frame beam 60. The rod 88 is connected to the cranks 78, 79, 80 and 81 of the rake wheels by means of spring and chain assemblies 90, 89. The rod 88 is carried by the frame so that the rod is axially displaceable in a direction parallel to the frame beam 60. The rod is connected with a lever 93 (see FIGURE 3) by a chain 91. The lever 93 is fixed upon a shaft 94 rotatably mounted on the frame. By swinging the lever 93 about its shaft 94, the rod 88 can be moved axially in the direction of the arrow VI. Such movement of the rod will cause the cranks of the rake wheels 82 to 85 to turn in their bearings 74, 75, 76 and 77 so as to raise the rake wheels from the ground. In order to hold the lever 93 in the position where the rake wheels are raised from the ground, corresponding to the transport position of the implement, the lever is provided with a locking device 95 which can be engaged behind a pin 96. This locking device is best illustrated in FIGURE 3. The lever 93 may be moved to any position on the quadrant and held in that position by one of the pins 96, with the locking device 95 engaged behind a pin 96. The pins may be removed and placed in other holes about the quadrant to lock the lever at other different positions of adjustment. As in the previous construction, the rake wheels can move to accommodate unevennesses of the ground.

In order to bring the implement shown in FIGURES 2 to 5 to a second working position in which each rake wheel independently works a strip of ground, the auxiliary supporting arms 70 to 73 are provided near the bearings 74 to 77 with additional bearers 99, 100, 101 and 102, which have been constituted as bearings. Owing to this the free end of each auxiliary supporting arm carries two bearers for the mounting of an associated rake wheel in either of the two positions corresponding to the two working positions of the implement. The bearings 74 to 77 and the bearings 99 to 102 are formed to provide a pair of bearings from one piece of material as shown in FIGURE 4 in respect of the bearings 74 and 99; the material may be of a kind which can be readily cast or compression- or injection-moulded. It is noted that the bore of this bearing 74 runs into the bore of the bearing 99. The axes of the bearings 74 and 99 intersect at an angle of about 90°. The axes of the bearing 74, in which the crank 78 is mounted for the position as a side-delivery rake, inclines the frame beam 60 at an angle of about 90°. The bearings are arranged at a distance from the frame beam which is about equal to half the diameter of a rake wheel. When the implement is changed from the first working position to the second, the cranks 78 to 81 are removed from their bearings 74 to 77 and are disposed in the bearings 99 to 102. The rake wheels 82 to 85 will then occupy the positions indicated in broken lines, whereby the axes of rotation of the rake wheels are substantially in alignment. In this second working position, the implement is again moved by the draw-bar 86. When the implement is being brought from the first working position to the second, the draw-bar 86 may remain coupled to the tractor or the like. A change in the direction of travel from that indicated by the arrow V to that indicated by the arrow VII can be made simply by unlocking the ground wheel 63 and bringing it to the setting indicated in broken lines. The ground wheel 63, which is almost in alignment with the rake wheels, is then once more locked. The ground wheel 62 is unlocked and when the implement begins to move in the direction VII dictated by the direction control wheel 63 the ground wheel 62 will automatically take up the position indicated in broken lines, since this ground wheel 62 is mounted also to act as a caster wheel. When the ground wheel 62 is in the appropriate position, it may be relocked. It will be realized that the implement takes up its new position by effectively moving around the axis of the axle 64. In the new position the line of the row of rake wheels near which the direction control wheel 63 is located, will be oblique to the line of draught. Such row will lie to the right and rear of the line of draught. When the implement is being brought to its second working position, the chains 89 must be disconnected from the rod 88. The chains are then reconnected with one arm 103 of a bellcrank lever the other arm of which is connected to the rod 88 with a chain 104. The two working positions of the implement shown in FIGURE 2 correspond to side-delivery raking and tedding. It may be desired to have a third working position in which the implement will operate as a swath turner. To transform the implement into a swath turner, the rake wheels will have to be arranged in groups. For this purpose, the frame has an auxiliary beam 105 on which are three bearings 106, 107 and 108 for two rake wheels. The distance between the first bearing 106 and the second bearing 108 is about as large as the distance between the bearings 74 and 75, whilst the distance between the bearing 108 and the third bearing 107 is about equal to half the distance between the first bearing 106 and the second bearing 108. The supporting arm 71 is also provided with an additional bearing 109 located at the end of a finger 110, the bearing 109 being located at a distance from the bearing 75 which is at least about one-third of the distance between the bearings 74 and 75. If two rake wheels are taken from the frame beam 69 and rearranged on the beam 105, either the wheel 61 or the wheel 63 will ride over the crop. This can be avoided by slightly adjusting the rearmost ground wheel 63 about its vertical swivel axis, so that the implement will swing to the right, whereby the distance between the wheels 61 and 63, as measured transversely to the direction of travel, will be reduced. According to the swath, either the rake wheel 83 is arranged in the bearing 109, whilst the rake wheels 82 and 85 are arranged in the bearings 106 and 107, or the rake wheel 83 is left in the bearing 75 and the rake wheel 85 arranged in the bearing 108.

In order to allow the rake wheels on the frame beam 105 to be lifted clear of the ground, a rod 111 is slidably supported on the frame beam 105, this rod being connected by means of a chain 112 with a lever 113 fast on the shaft 94. By swinging the lever 93 the rod 110 can also be moved, the latter being connected by chain spring assemblies with the cranks of the rake wheels, whereby the latter can be adjusted.

As shown in FIGURES 6 to 9 the third embodiment comprises a frame 116, which is supported on three ground wheels 117, 118 and 119. The frame 116 is provided with four rake wheels 120, 121, 122 and 123, which are secured to a frame beam 124 of the frame 116. The frame 116 further comprises a frame beam 125, which is secured to the front end of the frame beam 124 and has a portion 126 extending parallel to the frame beam 124. The fastening of the frame beam 125 to the frame beam 124 is reinforced by a frame beam 127 which extends from the rear end of the frame beam 124 to a location near a bend in the frame beam 125 at the front end of the portion 126. For mounting the rake wheels 120, 121, 122 and 123 on the frame beam 124, the latter has four brackets 128, 128A, 128B, 128C to which are hingedly secured auxiliary supporting arms 130, 130A, 130B, 130C by means of vertical hinge pins 129, 129A, 129B, 129C. The ends of the arms 130 are provided with bearings 131 in which cranks 132 are journalled, the cranks carrying the rake wheels 120 to 123 at their free ends. The arms 130 are arranged in such a way that they are on, or about on, the level of the axes of rotation of the rake wheels. A rod 133 lies along and over the beam 124, the rod being so supported on the beam as to be movable axially. The cranks 132 are connected with the rod 133 by means of springs 134 and chains 135. The rod 133 is connected with the aid of a chain 136 to an arm 137 on a shaft 138 which has a lever 139 fast thereon to permit turning thereof. By turning the shaft 138 the rod 133 can be moved axially, whereby the cranks 132 are turned in their bearings 131 and the rake wheels 120 to 123 are displaced vertically with respect to the frame 116.

The auxiliary supporting arms 130 are provided, near their vertical pivot pins 129, with levers 140 which are connected with a coupling bar 141 by means of vertical pivots 142. The coupling bar 141 is arranged at the other side of the pivot pins 129 on the auxiliary supporting arms 130. The coupling bar 141 is connected to a sector plate 144 through a vertical pin 143, the sector plate being located at a higher level than the coupling bar 141 and being turnable about a vertical axle 145, which supports the ground wheel 118. The axle 145 has rigidly secured to it a locking lever 146, which can be locked to the sector plate 144 in any one of the locations indicated at 147, whereby the plate 144 can be adjustably fixed in relation to the ground wheel 118. In other words, the structure indicated by reference numerals 146 and 147 whereby the plate 144 can be adjustably fixed in relation to the ground wheel 118 comprises an adjustable lever. This is a locking lever and sector which may be found in a variety of arts.

The frame beam 124 carries a bracket 148 in which there is a hole 149. Movement of the coupling bar 141 can be prevented by means of a locking pin 150 inserted in the hole 149 and one of a series of holes 151 in the coupling bar 141. Locking of the coupling bar 141 results in the holding of the ground wheel 118 in a fixed position in relation to its swivel axis afforded by the axle 145, and results also in the locking of the rake wheels against swinging about the axes of their hinge pins 129.

In order to move the implement whilst in its working position shown in FIGURE 6, the front end of the frame beam 125 is provided with a draw-bar 152, which is connected with the vertical swivel axle 153 of the ground wheel 117, so that this ground wheel constitutes a steerable wheel. With the direction of travel indicated by the arrow X, the implement acts as a side-delivery rake, in which the rake wheels 120 to 123 all co-operate to deliver the crop laterally. It is noted that the row of rake wheels, in this working position, lies obliquely to and mainly to the left of the line of draught of the implement as viewed in the direction of travel. The frame with the coupling bar 141 is located behind the row of rake wheels with respect to the direction of travel. In this working position also the ground wheel 119, which can be swung about its swivel axle 154 with respect to the frame 116, is locked against such swinging movement by means of a locking device 155. In the working position shown in FIGURE 6 the ground wheels 118 and 119 will thus both act as direction control wheels.

The implement can be brought to a second working position, in which each rake wheel, independently of the other rake wheels, works a strip of ground. This second working position is shown in FIGURE 7. This working position can be attained by releasing the locking pin 150 and by subsequently moving the rake wheels 120 to 123 into their positions shown in FIGURE 7 by turning them with the aid of the auxiliary supporting arms about their vertical hinge pins 129. During this turning movement, because of the connection between the rake wheels 120 to 123 and the ground wheel 118 afforded by the coupling bar 141, the ground wheel 118 will be brought to a new setting. In this second working position the rake wheels 120 to 123 and the ground wheel 118 are locked against turning about the hinge pins 129 and axle 115 respectively, by the locking pin 150. In the second working position the implement is moved in the direction of the arrow XII, which direction is automatically set for the ground wheel 118. In the second working position in which the implement can be brought from the first working position with disconnection the implement from a tractor or the like, the row of rake wheels lies obliquely to and mainly to the right. The frame in the second working position being located ahead of the row of rake wheels. The setting of the ground wheel 118 can be adjusted to some extent relatively to the rake wheels and the frame, by releasing the locking lever 146 from one location 147 and bringing it to another location 148. In order to adjust the rake wheels vertically in this working position with the aid of the rod 133, the chains 134 are guided over a part of the circumference of jockey pulleys 156 being rotatable about vertical axes 157. During changing over from one working position to the other, each spring 134 and a portion of the associated chain 135 will turn with the rake wheel about its pivot pin, whilst the distance between each crank 132 and the fastening to the rod 133 effectively remains the same. The pulleys 156 are each mounted on a pin 157, which is spaced from the hinge pin 129 by a distance such that part of the periphery of each pulley 156, over which the chain 135 is guided, is located just above the pin 129. Owing to this connection of the cranks 132 to the rod 133 the lifting device need not be adjusted during the turning of the rake wheels about their pivot pins. Though in this embodiment the flexible connection between the cranks 132 and the rod 133 consists of chains, it is also possible to use other flexible means such as wires or the like which can be trained about the pulleys 156. By means of the assembly comprising the rod 133 and the lever 139, the rake wheels 120 to 123 can be lifted from the ground in both working positions to an extent such that a transport position can be attained, in which the rake wheels are clear of the ground.

The implement may be brought to a third working position, in which the rake wheels are arranged in two groups. For this purpose the portion 126 of the frame beam 125 is provided with two bearings 159, in which the cranks 132 of the rake wheels, for example 122 and 123, can be mounted. A rod 160 is slidably arranged upon the portion 126, and is connected with an arm 162 by means of a chain 161. The arm 162 is fast upon the shaft 138 so that the rake wheels supported on the portion 126 of the frame beam 125 can be vertically adjusted by means of the lever 139 and, if desired, can be brought to a transport position.

In the third working position, the rake wheels 120 and 121 are located in the position and setting shown in FIGURE 6, whilst the rake wheels 122 and 123 have their cranks mounted in the bearings 159 so that their setting is similar to that of the rake wheels 120 and 121. Hence two groups of rake wheels are afforded, the wheels of each group co-operating with one another to work a separate strip of ground, the implement then acting as a swath turner. In other words, should the cranks of the rake wheels 122 and 123 be changed so as to be supported by the bearings 159, the device becomes a swath turner, with the rake wheels arranged in the same manner as shown in FIGURE 5.

In the working positions shown in FIGURES 6 and 7, the rake wheels are arranged in one row, the auxiliary supporting arms 130 extending along the frame beam 124 in the first working position, whilst in the second working position the auxiliary supporting arms support the rake wheels whereby these wheels are at an angle of about 90° to the frame beam 124, whereby the axes of rotation of these rake wheels are in alignment. In the two working positions the implement has the same point of traction.

In the working position as a side-delivery rake, a large quantity of crop can be located in front of the rake wheels. Since the frame elements are disposed at the rear side of the row of rake wheels, the crop located in front of the rake wheels will not be undesirably engaged by frame parts.

As shown in FIGURES 10 and 11 the fourth embodiment comprises a frame beam 165, which is provided with rake wheels 166, 167, 168 and 169, the rotary axes of which are level with the frame beam 165. The frame beam 165 carries auxiliary supporting arms 171, which are connected thereto by vertical pivots 172. The auxiliary supporting arms 171, at one side of the frame beam 165, are provided with bearings 173, in which the cranks 174 of the rake wheels 166, 167, 168 and 169 are journalled. At the other side of the beam 165 the supporting arms 171 have vertical pivots 175, by which they are connected to a frame beam 176, so that the auxiliary supporting arms 171 with the frame beams 165 and 176 consist of a parallelogram link structure. It is noted that the frame beams 165 and 176 with the arms 171 are on the level of the axes of rotation of the rake wheels. In this arrangement of the frame beams 165 and 176 and the auxiliary supporting arms 171 the rake wheels are located outside the planes enclosed by the parallelogram link structure. The auxiliary supporting arms 171 are locked against turning about their pivots 172 by a locking pin 178, which is entered in a hole in a lug 179 formed on the foremost arm 171. The pin 178 can be entered also in any one of a series of holes 180 formed in an arcuate strip 181 fixed to the beam 165, so that the auxiliary supporting arms 171 can be fixed in any one of a plurality of positions relative to the frame beam 165.

The implement is supported on three ground wheels 182, 183 and 184, the ground wheel 182 being attached to the front end of the frame beam 165, and the ground wheel 183 to the front end of the frame beam 176. The ground wheel 184 is a direction control wheel, and is attached to the rearmost arm 171 near the bearing 173. The ground wheel 183 is a caster wheel.

In the position shown in FIGURE 10 the implement, when moved in the direction shown by the arrow XIII, acts as a side-delivery rake, in which the rake wheels 166 to 169 all co-operate to deliver the crop to one side. In this working position as a side-delivery rake the implement lies obliquely to and mainly to the left of the line of draught of the implement as viewed in the direction of travel. The ground wheel 182 is connected with a draw-bar 185 on which a tractive force is exerted to propel the device.

The device can be brought in a simple manner to a position where it acts as a tedder by turning the frame elements of the parallelogram link structure. In the tedding position the rake wheels each work a strip of ground independently of one another, and they are brought to positions shown only for the rake wheel 166 in broken lines. In this second working position the implement is drawn in the direction of the arrow XIV, the necessary tractive force being exerted at the same point in the frame, i.e. on the shaft of the draw-bar 185, as in the first working position, so that the implement need not be disconnected from a tractor or the like when changing it from the first to the second working position. In this second working position the row of rake wheels lies obliquely to and mainly to the right of the line of draught. Since the ground wheel 184 is attached to one of the arms 171, this ground wheel 184 will automatically assume the correct setting for the direction of travel in this second working position. It is also possible to vary slightly the setting of the ground wheel 184 by adjusting the locking lever 186 to occupy any one of several locations 187 in relation to the sector plate 188. This adjustment may be used to bring the implement to a position where the overall transverse extent thereof is small, which is convenient for the transport of the implement on its ground wheels. When turning the rake wheels 166 to 169 about the pivots 172, the pivots 175 and the frame beam 176, which is a coupling member for the arms 171, will also turn about the pivots 172, whilst the ground wheel 183 and the ground wheel 184 are displaced with respect to the frame beam 165.

When bringing the rake wheels 166 to 169 from one working position to the other, they will turn, due to the coupling member 176, always in unison, so that a correct relative setting is always maintained and the changeover can be carried out very rapidly. Also in this embodiment, in the working position as a side-delivery rake, no frame parts are located in front of the rake wheels, so that the crop to be displaced along the front side of the rake wheels is not undesirably engaged by frame parts.

The points of pivotal connection of the links of the parallelogram structure are spaced apart by an adequate distance to ensure that the links do not obstruct one another.

Though in the embodiments the shaft, on which the propelling force is exerted, with the aid of a draw arm, is borne by a ground wheel, it will be possible to omit this ground wheel and to bear the fore end of the implement with the aid of a tractor or the like. Eventually the draw arm can be deleted too, or the same may be mounted on the shaft in such a way as to be turnable about the shaft instead of to be fixed thereto.

What I claim is:

1. An implement for the lateral displacement of crop lying on the ground comprising a frame, draft means on said implement freely rotatable about a substantially vertical axis, running wheel means including a plurality of running wheels attached to said frame, means on at least one of said running wheels for adjustably locking the same to said frame, means connecting one of said running wheels to said draft means whereby said last named running wheel may function as a steering wheel for said implement, a row of rake wheels each having a center of rotation, means supporting said rake wheels on said frame in at least two working positions of said frame, whereby in one position of adjustment said implement lies in an oblique position and substantially to the left of the line of draft through said draft means and in another position of adjustment said implement lies in an oblique position and substantially to the right of the line of draught through said draught means, said draught means being rotatable about the same vertical axis with respect to the frame in each of the said working positions, said vertical axis further being located approximately within a vertical plane which intersects the said centers of rotation of said rake wheels, said running wheel being connected to said draught means near said vertical axis.

2. An implement as claimed in claim 1 wherein said draft means comprises a draw bar, one of said running wheels having a vertical shaft located substantially within said vertical plane, said running wheel connected to said draft means being mounted at one end of said vertical shaft.

3. An implement as claimed in claim 1 wherein said means for supporting said rake wheels on said frame includes an auxiliary supporting arm for each rake wheel, means pivotally connecting one end of said arm to said frame and connecting the other end of said arm to said rake wheel.

4. An implement as claimed in claim 1 wherein said means for supporting said rake wheels on said frame comprises an auxiliary supporting arm whereby to support one rake wheel.

5. An implement as claimed in claim 1 wherein said frame includes a frame beam, said means for supporting said rake wheels on said frame including a plurality of supporting arms, means for movably mounting said supporting arms on said frame whereby said supporting arms in one of their positions extend in a direction parallel to said frame beam.

6. An implement as claimed in claim 5 wherein each supporting arm may be adjusted within the quadrant of a circle defined by the frame beam and a plane perpendicular thereto and including the pivot of its supporting arm.

7. An implement as claimed in claim 5 wherein the distance of the centers of the rake wheels from the frame beam is less than the radius of the rake wheels.

8. An implement as claimed in claim 4 wherein said means mounting said arm permits movements in a substantially horizontal plane only.

9. An implement as claimed in claim 3 wherein said means for supporting said rake wheels on said frame includes a crank connecting each rake wheel to said frame.

10. An implement as claimed in claim 9 characterized by means for lifting all of said rake wheels in a vertical direction.

11. An implement as claimed in claim 10 wherein said lifting means includes a part located adjacent the pivot of each supporting arm whereby the rake wheels may be coupled with the said lifting device in at least two working positions of the rake wheels.

12. An implement as claimed in claim 11 wherein each of said parts is located on one side of said pivot in one of said working positions and on the other side of said pivot in the other of said working positions of said implement.

13. An implement as claimed in claim 1 wherein means are provided for lifting said rake wheels in a vertical direction comprising a bell crank lever for each rake wheel, a crank for each rake wheel, and an operating rod for said bell crank lever, one end of each bell crank lever being connected to said rod and the other end being connected to a crank.

14. An implement as claimed in claim 13 wherein said last-named means includes a flexible means and a pulley over which said flexible means is trained.

15. An implement as claimed in claim 1 wherein said means for supporting said rake wheels on said frame includes a supporting arm for each rake wheel, said frame being located rearwardly of the said row of rake wheels.

16. An implement as claimed in claim 1 wherein said means for supporting said rake wheels on said frame includes a plurality of arms, means pivotally attaching said arms to said frame, and an auxiliary beam pivotally connected to said arms and forming with said beam and said arms a plurality of parallelograms.

17. An implement as claimed in claim 16 wherein at least one of said running wheels is connected to said auxiliary beam.

18. An implement as claimed in claim 1 wherein said means for supporting said rake wheels on said frame includes a plurality of arms fixed relative to said frame and extending perpendicularly from said frame, each of said arms having a free end, a bearing means on said free end, said bearing means including two bearings, whereby each of said rake wheels may be mounted in either of said bearings.

19. An implement as claimed in claim 18 wherein the center lines of the two bearings intersect.

20. An implement as claimed in claim 18 wherein said bearings are located at a distance from said frame which is greater than a quarter of the diameter of a rake wheel.

21. An implement as claimed in claim 18 wherein said bearings are located at an angle of about 90° with reference to each other.

22. An implement as claimed in claim 1 wherein said rake wheels in one of their working positions are in substantial alignment with each other.

23. An implement as claimed in claim 1 wherein one of said running wheels is mounted on said frame in advance of said rake wheels and another of said running wheels is located adjacent the rearmost rake wheels.

24. An implement as claimed in claim 23 wherein said running wheel located in advance of said rake wheels is located on the same side of said frame as said rake wheels and said rearmost running wheel is located rearwardly of the rearmost rake wheels.

References Cited in the file of this patent

UNITED STATES PATENTS

| | | |
|---|---|---|
| 2,447,354 | Morrill | Aug. 17, 1948 |

FOREIGN PATENTS

| | | |
|---|---|---|
| 183,982 | Austria | Dec. 10, 1955 |
| 556,272 | Italy | Feb. 4, 1957 |
| 209,132 | Australia | July 5, 1957 |
| 562,787 | Belgium | Dec. 14, 1957 |